241-277. OR X 9,773 SR

DRAFTS

NO PRINTED SPECIFICATION AVAILABLE

~~1302~~

H. Mellish.

Vegetable Cutter.

9,773X

Patented Jun. 26, 1836.

T 241/277

4

N. PETERS, PHOTO-LITHOGRAPHER, WASHINGTON, D. C.

June 25. 1836 281.
9773X

Henry Mellish, of Walpole, N.H.: Letters Patent.

The schedule referred to in these Letters Patent, and making part of the same, containing a description in the words of the said Henry Mellish himself, of the improvement in the vegetable Cutter.

---

Figure 2:
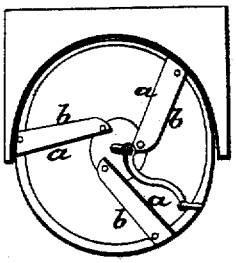
Figure 1:
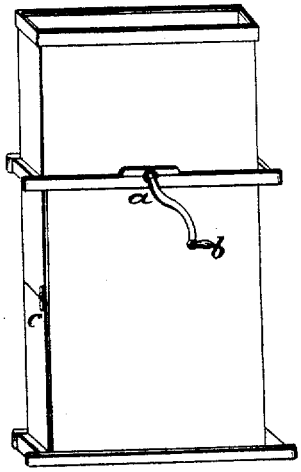

To all to whom these presents shall come; Be it known, that I Henry Mellish, of Walpole, in the County of Cheshire and State of New Hampshire, have invented a new and useful improvement, in the useful arts, being a machine for cutting vegetables, called Mellish's vegetable cutter, and that the following is a full and exact description thereof reference being had to the annexed drawings — Fig. 1. is a perspective view of the machine, which consists of a box four feet high, one foot ten inches wide, and one foot five inches deep, which is made of boards three fourths of an inch thick, with a band of wood round the bottom, also one round it one foot four inches below the top, both made of square timber one and a half inches thick — This box has a door on one side where a box may be put in to catch the vegetables when cut see, c, fig. 1 — Fig. 2. is a wheel of cast iron twenty inches in diameter, and three fourths of an inch thick — This wheel has three openings in it two and a half inches wide, at equal distances apart, commencing three fourths of an inch from the periphery and running obliquely, eight inches eight inches and a half, to within two inches of the centre; which openings divide the wheel into three wings, which are attached to the centre and connected at the periphery by a bar of three fourths of an inch square — These wings are one fourth of an inch thick within the bars, being brought to an edge on the side a, and running obliquely from one side of the wheel to the other; so that one edge of each wing is on a level with one side of the wheel, and the other edge on a level with the other — Over each of these openings a knife of steel plate ten inches long and two and a half wide is placed, and made fast by passing bolts through the ends, the back of the knives against the edges of the wings a, so that the edges of the knives will stand off from the wings at b, half an inch — Through the centre of this wheel an arbour is placed, sufficiently long to reach through the box and take a bearing on the uper band on each side of the box, see a, fig. 1. and to receive the crank b, on the end of it — This wheel is placed in the box at the distance of two inches from one side, with a partition with a semi circle cut in one end to fit the periphery of the wheel, which partition is put down in grooves in each side of the box, so as to stand directly over the wheel. To form the hoper, a bar two inches square is made fast under the arbour running across the face of the wheel, on this bar the lower end of a partition is fastened, which runs upwards with a slant of forty five degrees to the side of the box, where it is fastened — Operation — put the vegetables into the hoper at the top of the box, when they will come in contact with the knives, and the face of the wheel, then by turning the crank b, they will be cut and pass through the spaces between the knives and the wings of the wheel, and fall into the bottom of the machine, or a box in the bottom for the purpose of receiving them — It is also intended, that for the purpose of cutting the larger kinds of vegetables, that short knives may be inserted into the wings of the wheel directly in front of the long knives, in order to divide the slices as they are cut, the short knives crossing the space between the long ones and the plates of the wheel —

What I claim as my invention and for which a Patent is desired, is the above described wheel and cutters, or in so constructing the wheel as to let the vegetable pass through it as fast as cut. The size proportions and material of which made, may be varied to suit the views and purposes of the constructor —

Witnesses

David Fisher
Joseph Fisher

Henry Mellish

Drawings

Ryd.
A.G.C.

[illegible]